US008645199B1

(12) United States Patent  (10) Patent No.: US 8,645,199 B1
Sarkar et al.  (45) Date of Patent: Feb. 4, 2014

(54) USING APPLICATION CHARACTERISTICS FOR AD PRICING

(75) Inventors: Subhadip Sarkar, Sunnyvale, CA (US); Rajat Dewan, Mountain View, CA (US); Satyam Shaw, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 254 days.

(21) Appl. No.: 13/076,933

(22) Filed: Mar. 31, 2011

(51) Int. Cl.
*G06Q 30/00* (2012.01)
(52) U.S. Cl.
USPC ........................................................ 705/14.1
(58) Field of Classification Search
USPC ........................................................ 705/14.1
See application file for complete search history.

(56) References Cited

U.S. PATENT DOCUMENTS

2008/0109285 A1* 5/2008 Reuther et al. .................... 705/7

\* cited by examiner

*Primary Examiner* — Daniel Lastra
(74) *Attorney, Agent, or Firm* — Fish & Richardson P.C.

(57) ABSTRACT

This specification describes technologies relating to content presentation. In general, methods include the actions of receiving, for each of a plurality of mobile applications, application data associated with a respective mobile application of the plurality of mobile applications, the application data including different user interaction data associated with the respective mobile application; clustering applications of the plurality of mobile applications according to a classification; logging user interactions with each application of a cluster of applications for a plurality of users; generating an initial score for a first application in the cluster according to the logged interactions; and calculating pricing for content items served to the first application based on the initial score and an average score for applications in the cluster.

48 Claims, 6 Drawing Sheets

USING APPLICATION CHARACTERISTICS FOR AD PRICING

BACKGROUND

The present disclosure relates to content presentation.

Advertisers provide advertisements in different forms in order to attract consumers. Ads can be provided in electronic form. For example, online ads can be provided as banner ads on a web page, as ads presented with search results, or as ads presented in a mobile application.

SUMMARY

This specification describes technologies relating to content presentation.

In general, one aspect of the subject matter described in this specification can be embodied in methods that include the actions of receiving, for each of a plurality of mobile applications, application data associated with a respective mobile application of the plurality of mobile applications, the application data including different user interaction data associated the respective mobile application; clustering applications of the plurality of mobile applications according to a similar classification; logging user interactions with each application of a cluster of applications for a plurality of users; generating an initial score for a first application in the cluster according to the logged interactions; and calculating pricing for content items served to the first application based on the initial score and an average score for applications in the cluster. Other embodiments of this aspect include corresponding systems, apparatus, and computer program products.

These and other embodiments can optionally include one or more of the following features. The method further includes serving one or more content items to the first application according to the calculated application pricing. The one or more content items are advertisements. The data further include data associated with application information received from non-user sources. The application information includes one or more of a type of application or a country of prevalence for the application. Calculating application pricing for content items served to the first application includes increasing a pricing when the initial score for the first application is greater than the average score. Calculating application pricing for content items served to the first application includes decreasing a pricing when the initial score for the first application is less than the average score.

The method further includes logging user interaction with the first application over time; periodically calculating a new score based on the logging; and calculating the pricing based on the new score. Application pricing $\beta$ for content items served to the first application A is adjusted according to the function $\beta=\eta\times\alpha_A$, where $\eta$ is the current price for advertising in the first application A and $\alpha_A$ is a price indicator for the first application determined according to the formula $$\alpha_A = n \times (S_A \times U_A) / \sum_{i=0}^{n-1} S_i \times U_i, \text{ where } S_i$$

is a classification score for an application i in the cluster, $U_i$ is the user interaction score for an average user for an application i in the cluster and n is a number of applications in the cluster. The user interaction data is associated with a plurality of usage characteristics of the respective mobile application. The usage characteristics include user inputs to the mobile application. The usage characteristics include a duration of use for the mobile application. The duration of use is for each invocation of the mobile application. The duration of use is a total time over a specified time period. The method further includes classifying each application of the plurality of mobile application according to the received application data. Clustering includes clustering applications according to a similar classification.

Particular embodiments of the subject matter described in this specification can be implemented to realize one or more of the following advantages. A content pricing model for mobile applications (e.g., an ad pricing model) can be tailored to a quality measure of the mobile applications derived from different data associated with the mobile applications. In particular, the pricing model aims to provide an optimal pricing for advertisements that generates value for both publishers and advertisers. For example, the content pricing model provides a higher pricing for higher quality applications relative to lower quality application.

The content pricing model can increase return on investment for paying content providers. For example, a conversion rate for presented content can be increased when presented in mobile applications with a higher user interaction rate. Additionally, the content pricing model can be used to adjust price for different geographic locations or markets (e.g., according to competition levels). The pricing model also provides an incentive to application developers to produce higher quality mobile applications.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Mobile devices can include mobile applications for providing content to a user, e.g., news, games, and other information. Content items (e.g., ads) can be presented along with application content. Providing content items for display within the mobile application includes determining a pricing model for the mobile application. The pricing model is used to determine how much to charge a content provider (e.g., an advertiser) for content items served to the mobile application. To determine the pricing model for a given mobile application, various application data including usage characteristics can be used to evaluate the quality of the mobile application (e.g., a quality score for an application can be determined based on a set of data such as type/frequency of user interaction with the application, number of downloads, premium/free version, etc.).

A pricing function for the content items can be calculated based on the quality of the mobile application. Additionally, the pricing function can be specific to the application across all users of the application or can be specific to particular users based on the user's usage of the mobile application. In particular, in some implementations, the user interactions for a group of users of a single application are used to determine a pricing function for content items presented on that application. For example, interactions from each of the group of users of the application can be aggregated. The aggregated user interactions can then be used to determine a pricing model for the single application. Alternatively, in some other implementations, the pricing function can be based on user interactions with a group of similar applications.

While reference will be made below to advertising systems and methods, other forms of content including other forms of sponsored content can be managed, presented, and logged in accordance with the description below.

Figure 1:
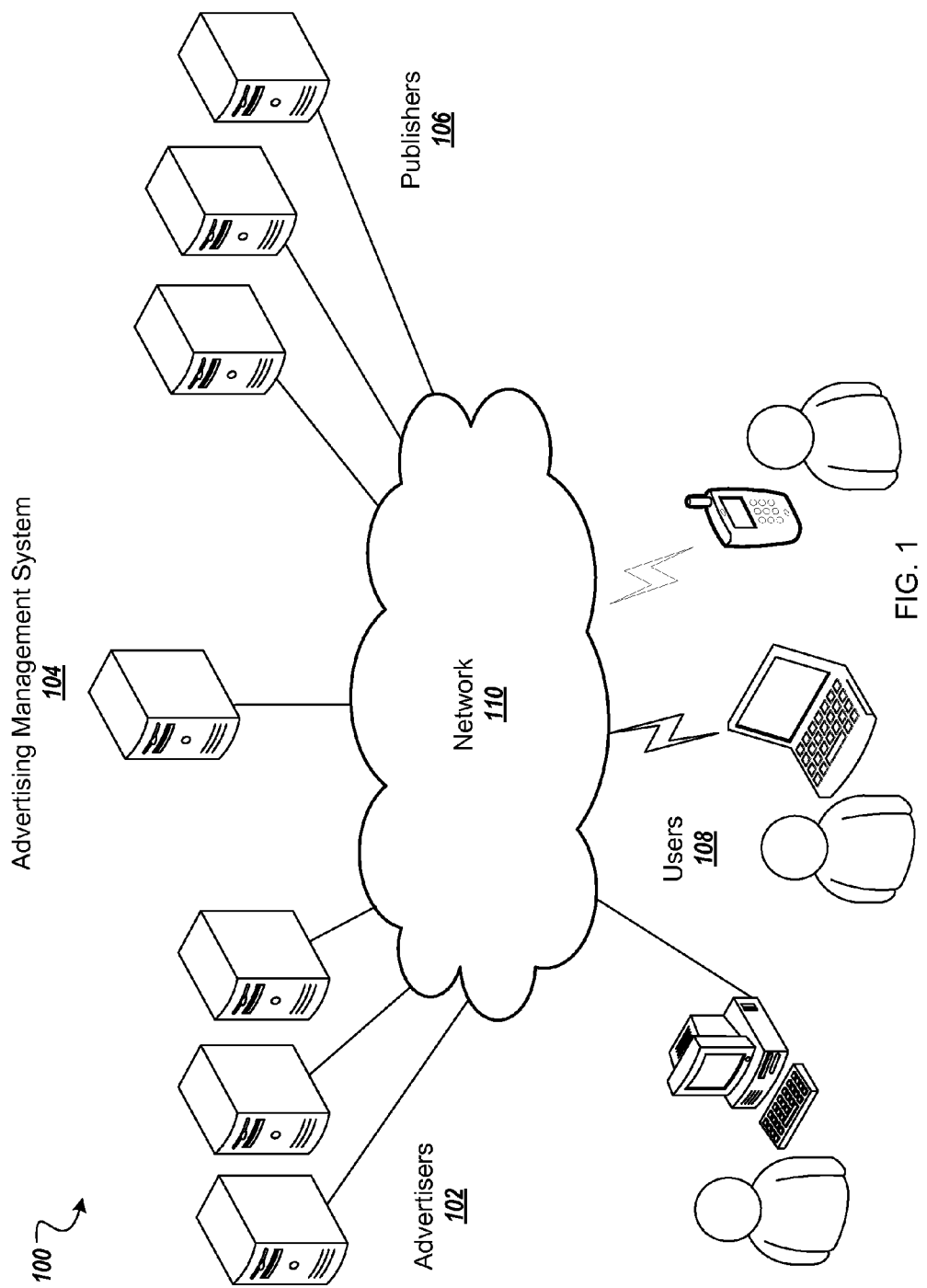
FIG. 1 is a block diagram of an example advertising system.

FIG. 1 is a block diagram of an example advertising system 100. In some implementations, one or more advertisers 102 can directly, or indirectly, enter, maintain, and log ad information in an advertising management system 104. Though reference is made to advertising, other forms of content, including other forms of sponsored content, can be delivered by the advertising system 100. The ads can be in the form of graphical ads, such as banner ads, text only ads, image ads, barcode ads (e.g., ads including one or more barcodes for use in redeeming the ads), audio ads, video ads, ads combining one or more of any of such components, etc. The ads can also include embedded information, such as links, meta-information, and/or machine executable instructions.

One or more publishers 106 can submit requests for ads to the advertising management system 104. The advertising management system 104 responds by sending ads to the requesting publisher 106 for placement on or association with one or more of the publisher's content items (e.g., web properties). Example web properties can include web pages, television and radio advertising slots, and even print media space.

Other entities, e.g., users 108 and the advertisers 102, can provide usage information to the advertising management system 104, for example, whether or not a conversion or click-through related to an ad has occurred. This usage information can include measured or observed user behavior related to ads that have been served. The advertising management system 104 can perform financial transactions, for example, crediting the publishers 106 and charging the advertisers 102 based on the usage information.

A computer network 110, e.g., a local area network (LAN), wide area network (WAN), the Internet, or a combination thereof, connects the advertisers 102, the advertising management system 104, the publishers 106, and the users 108.

One example publisher 106 is a general content server that receives requests for content (e.g., articles, discussion threads, music, video, graphics, search results, web page listings, information feeds, etc.), and retrieves the requested content in response to the request. The content server can submit a request for ads to an advertisement server in the advertising management system 104. The ad request can include the number of ads desired. The ad request can also include content request information. This information can include the content itself (e.g., page, video broadcast, radio show, or other type of content), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server or a client browser combines the requested content with one or more of the ads provided by the advertising management system 104. For example, the content and ads can be received separately and rendered together contemporaneously or as content is received. Alternatively, the combined content and ads (e.g., from a content provider) can be sent to the users 108 that requested the content for presentation in a viewer (e.g., a browser or other content display system).

Alternatively, in some implementations, content and ads are requested separately by the users 108 (e.g., received content can include code for requesting ads when rendered by a browser or other application or ads can be incorporated in content as received from an ad system). The content server can transmit information about the ads back to the advertisement server, including information describing how, when, and/or where the ads are to be rendered (e.g., in HTML or JavaScript™).

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results.

The search service can submit a request for ads to the advertising management system 104. The request can include a number of ads desired. This number can depend on the search results, the amount of screen or page space occupied by the search results, the amount of screen or page space available for the search results and the ads, the size and shape of the ads, etc. The request for ads can also include the query (as entered or parsed), information based on the query (such as geo-location information, whether the query came from an affiliate and an identifier of such an affiliate), and/or information associated with, or based on, the search results. The information can include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores are computed from, for example, dot products of feature vectors corresponding to a query and a document, page rank scores, and/or combinations of IR scores and page rank scores, etc.

In some implementations, the advertising management system 104 includes an auction process to select ads from the advertisers 102. For example, the advertisers 102 may be permitted to select, or bid, an amount the advertisers 102 are willing to pay for each presentation of or interaction with (e.g., click) of an ad, e.g., a cost-per-click amount an advertiser pays when, for example, a user clicks on an ad. The cost-per-click can include a maximum cost-per-click, e.g., the maximum amount the advertiser is willing to pay for each click of an ad based on a keyword, e.g., a word or words in a query. Other bid types, however, can also be used. Based on these bids, ads can be selected and ranked for presentation.

The search service can combine the search results with one or more of the ads provided by the advertising management system 104. This combined information can then be forwarded to the users 108 that requested the content. The search results can be maintained as distinct from the ads, so as not to confuse the user between paid ads and presumably neutral search results.

In some implementations, one or more of the publishers 106 submit requests for ads to the advertising management system 104. The advertising management system 104 responds by sending ads to the requesting publisher 106 for placement on one or more of the publisher's web properties (e.g., websites and other network-distributed content) that are relevant to the web property. For example, if one of the publishers 106 publishes a sports-related web site, the advertising management system 104 can provide sports-related ads to the publisher 106.

In some other implementations, the requests are executed by devices associated with the user 108, e.g., by the execution of a javascript when the publishers web page is loading on a client device. For example, a loading web page can include scripts to request one or more ads for placement within the rendered web page. The browser or other application can send an ad request in response and incorporate received ads into the web page.

Another example publisher 106 is a mobile application developer. A mobile application is an application specifically designed for operation on a mobile device (e.g., a smartphone). The mobile application can also include one or more ads positioned within the content of the mobile application. Similarly to publishers 106, the ads can be received from the advertising management system 104 for placement in the mobile application when accessed by a user (e.g., when a particular page of a mobile application is loaded on the mobile device). Mobile applications are described in greater detail below with respect to FIG. 2.

Figure 2:
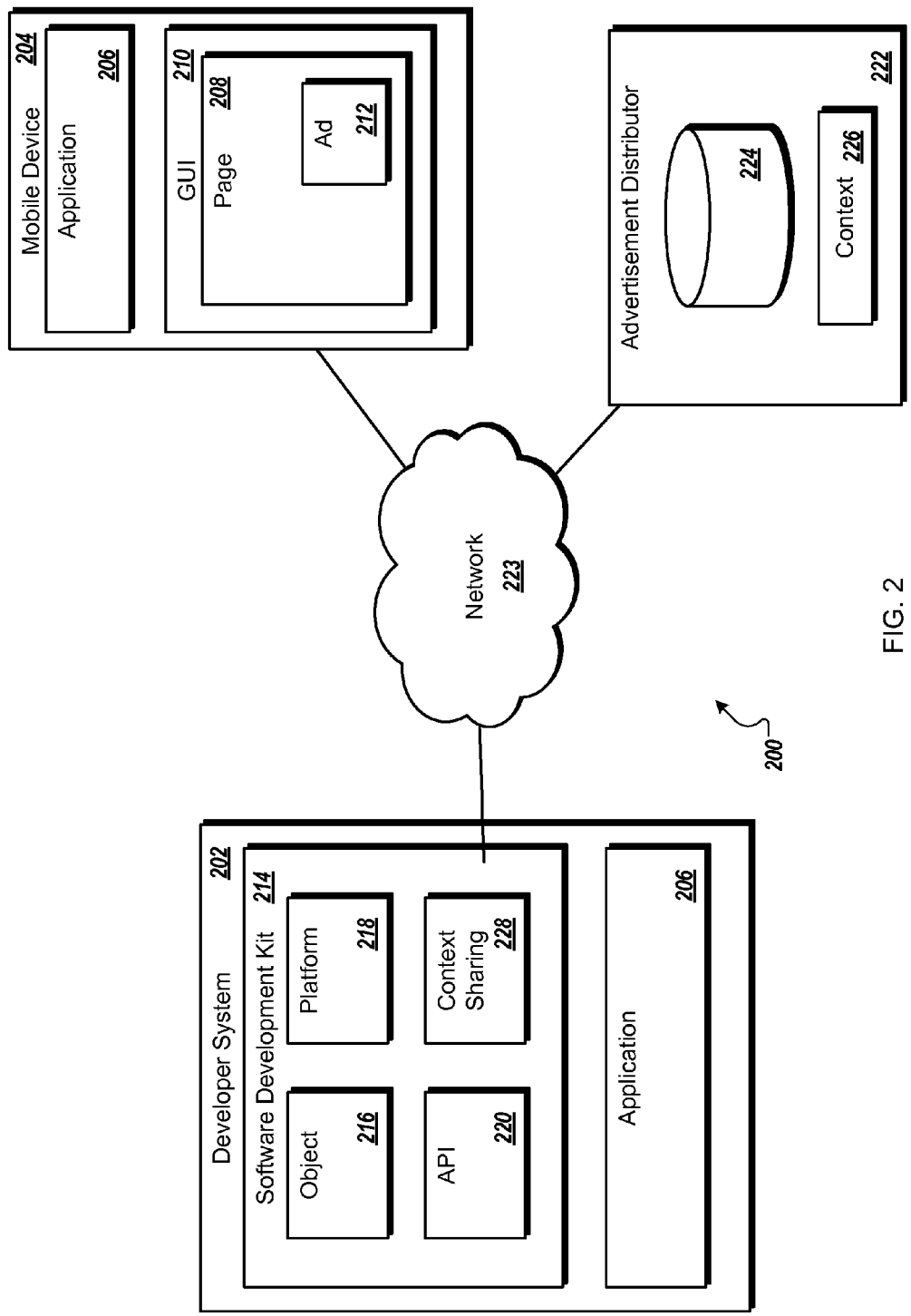
FIG. 2 is a block diagram of an example system including a mobile device application.

FIG. 2 is a block diagram of an example of a system 200 including a mobile device application. In this example, a developer system 202 can be used by a developer to create program content such as applications for one or more mobile devices 204. The mobile devices 204 can include, for example, a cellular telephone, a personal digital assistant or any other type of mobile device. Particularly, the developer can create an application 206 such as by generating program code and compiling it into an executable program compatible with the mobile device 204. The application 206 can be formulated so that it presents one or more pages 208 in a graphical user interface 210 of the mobile device 204, such as on a display screen. Individual systems and/or components can be implemented using hardware, firmware, software, or combinations thereof, and can be divided or joined into different number of units. Examples below will illustrate how the developer can configure the application 206 so that content 212, for example, as an advertisement from a third party, can be presented on the page(s) 208 when the application 206 is being executed.

A software development kit 214 can be provided to the developer for creating the application 206 and/or other programs. The software development kit 214 can provide editors for code and/or pseudocode, one or more compiling functions, emulating functions for previewing display content, and a debugging function, to name just a few examples. In some implementations, the software development kit 214 is also configured to provide the developer a convenient way of adding third-party content such as advertisements to a program created for mobile devices. For example, the software development kit 214 can provide the developer with the necessary code and/or other application content so that advertisements are requested, displayed to a user, and that any interaction between the user and the ad is logged.

The software development kit 214 can provide one or more objects 216. In some implementations, the developer incorporates the object 216 in the code when creating the application. For example, the software development kit 214 can provide the object(s) 216 on a screen, such as where the developer generates the overall application content, in a way that the developer can select the object and include the corresponding material in the application 206 as it is being created.

The software development kit 214 can be configured so that the application(s) 206 can be created according to a particular platform 218. In some implementations, the platform 218 is targeted to mobile devices, such as to the type of the mobile device 204 which can include a cell phone, a handheld device, or a personal digital assistant, to name just a few examples. For example, the platform 218 can be a platform created or supported by the Open Handset Alliance. In some implementations, the object 216 is included before the application code is compiled into an executable program. For example, the object 216 can be incorporated as an integrated part of the application by inserting code before compilation.

The object 216 can perform one or more functions. In some implementations, the object 216 causes third party content such as the advertisement(s) 212, to appear on the mobile device 204. For example, the object 216 can be responsible for requesting relevant ad(s), displaying the ad(s) in the right manner to the user, and logging whether the user clicks on the ad or otherwise interacts with the ad.

In some implementations, the object 216 is a Java object that is configured to be added to a user interface of the application 206 and handle fetching and rendering of, and interaction with, content such as advertisements. For example, the developer can implement a view object that extends a view class associated with the application 206. In some implementations, an advertising view object could include the following: GoogleBaseAdView(String client).

This object can represent a base class to create an advertisement view. A constructor can set the client parameter in a content ads request that can include a URL for a frontend involved in content requests. The above object can extend a more general view class, e.g., as a WebView class, and can in some implementations be extended by other more specific classes directed at advertising. In some examples, such an extension can use void setAdLayoutType(int placement) to specify top and/or bottom placement of the view that requests the content. Other ways of displaying the content (e.g., an ad) can be used, such as a gallery that places thumbnails of image content in a gallery view.

One or more functions can be used with the object 216. Such function(s) can customize the look and feel of the content when it is displayed. In some implementations, such function(s) set one or more CGI parameters in a content request.

An application program interface (API) 220 can be used with the object 216. In some implementations, the API 220 is a Java API that a developer can call when incorporating content such as advertisements into the application 206. For example, the object 216 can include a Java code snippet that uses the Java API so that the developer can insert the code into the application 206. As noted earlier, such a code snippet can construct a request for content such as an ad based on a developer's customization, fetch the content and write it to the user interface of the application 206.

The ad 212 can include a number of different types of content. In some implementations, ad types including, but not limited to, text ads, image ads (including static and animated images) and video ads can be used. For example, the ad can provide for user navigation (e.g., a link) to other content associated with the advertiser. Other types of content are possible (e.g., non-advertising content).

An advertisement distributor system 222 can be used to forward any type of content such as the ad 212 to the mobile device 204 and/or the developer system 202. In some implementations, the advertisement distributor system 222 is configured to receive request(s) for content from the mobile device 204, fetch one or more matching ads or other content from a repository 224, and forward the matching content to the mobile device 204. For example, the matching of the ad 212 can be performed using a context component 226 that can provide one or more context parameters associated with the application 206 configured for identifying matching content/advertisements.

The developer system 202, the mobile device 204 and/or the advertisement distributor system 222 can be connected using any kind of network 223, such as the Internet. For example, the developer system 202 and the advertisement distributor system 222 can communicate using the TCP/IP suite of protocols and the mobile device 204 can communicate using any kind of wireless protocol, such as IEEE 802.11, wireless application protocol (WAP) and/or Bluetooth.

Relevant context of the application 206 and/or the mobile device 204 can be shared in different ways. In some implementations, the developer can share context including metadata about the application 206 with the advertisement distributor system 222. A context sharing component 228 in the software development kit 214 can allow the developer to enter one or more keywords that the developer decides are relevant for retrieving and presenting content such as advertisements. For example, the developer who creates the application can submit the keyword(s) using the context sharing component 228 for receipt by the context component 226 for storage. In some implementations, monitoring can be performed to determine how well the submitted metadata correlates with the application 206 and if necessary, modifications in the used context parameter(s) can be made.

In some implementations, context can be shared by the developer submitting the application 206 to the advertisement distributor system 222. The context sharing component 228 can be used in submitting some or all of the application 206 for use in evaluating context. This can be done as part of a setup process so that the advertisement distributor system 222 can examine the application to determine the context of the content/ads to be forwarded. Examples of aspects that can be taken into account include, but are not limited to, textual content of a previous screen or page on the mobile device 204, a content of the entire application 206, and/or content of other view objects such as sibling objects.

Analysis of the application 206 can include analyzing the code (such as by static analysis), determining a general context of the application 206, or determining the specific context of one or more of the particular pages 208. This can require the context component 226 to determine which of the pages 208 is currently active in the mobile device 204. For example, this can be done using a version of the application 206 provided by the developer. If or when the application 206 is later updated, a revised version can be forwarded to the advertisement distributor system 222, for example using the context sharing component 228, so that the context can be updated if necessary.

As another example, context can be determined by providing that the developer can specify one or more hooks in the code of the application 206. In some implementations, the software development kit 214 and/or the platform 218 can provide such feature(s). For example, a global variable can be made to change state at one or more stages of the application 206. Such a variable can be read by the object 216, such as by a snippet of Java code.

Context parameter(s) for use in finding matching content (e.g., ads) can be stored in any of a variety of forms. For example, the context component 226 can store one or more keywords, categories, labels, topics, context information and/or any other kind of parameter for use by the advertisement distributor system 222.

The following is an example of how an implementation as described above can be used. A developer can create the application 206 intended for the mobile device 204 using the software development kit 214. Particularly, the application 206 can be created according to the platform 218 and can include the object 216. The developer can forward the application 206 to the mobile device 204 for use, for example when the mobile device 204 is initially sold or as a later update, such as by a download process. The developer can also provide context relating to the application 206, such as by submitting one or more keywords and/or providing a version of the application 206, using the context sharing component 228. One or more context parameters can be registered at the advertisement distributor system 222.

When a user operates the mobile device 204, content such as one or more ads 212 can be presented on the page(s) 208. The content can be selected for presentation by the advertisement distributor system 222 based on the context parameter(s). In some implementations, the user can interact with the ad(s) 212 in one or more ways, such as by clicking on the ad 212, performing a developer-specified combination of key presses (e.g., tapping a single key twice, or tapping two keys in rapid succession), or tapping on the ad on a touchscreen device.

Content (e.g., ads) can be retrieved in any of a variety of ways. In some implementations, content can be retrieved essentially according to an on-demand approach. For example, ads or other content can be requested from the advertisement distributor system 222 and forwarded from there for display. Such implementations can have the advantage that the ad that is displayed to the user can be very current to the particular state of the application 206 and/or the mobile device 204.

In some implementations, a pre-fetch approach is used. For example, a developer can configure the application 206 such that multiple content portions such as ads are requested from the advertisement distributor system 222. The ads can be stored at a suitable location, such as on the mobile device 204 and/or on another computer device such as a server that communicates with the mobile device 204. At some point, such as by determination performed by the application 206, the ad(s) can be displayed on the mobile device 204, for example when it returns to an online mode after having been offline. The developer can provide for reporting of which contents/ads have been displayed, for example by incorporating a feature from the software development kit 214 into the application 206.

In some implementations, client-side frequency capping is used, for example by having a class associated with content/ad presentation, logging previously served content/ads, and ensuring that the same content/ad is presented according to a rule (e.g., not more than a predetermined number of times per session). Other approaches for fetching content can be used.

In some implementations, a new content portion such as the ad 212 can be presented when an activity that uses the class associated with content/ad presentation is displayed for the first time. As another example, the new ad/content can be presented when the activity has been removed from an activity stack in the mobile device 204. In yet another example, a content/ad can be presented if a previous ad/content has been displayed for a predetermined amount of time if the mobile device 204 continues to be active (e.g., if a backlight of the display on the device remains on). In some implementations, the developer can facilitate user-initiated refresh of content/ads using a class responsible for generating gallery views, for example to provide a carousel-style browsing of ads.

The software development kit 214 has been mentioned in examples above. In some implementations, the software development kit 214 can be extended or enhanced using a wizard in an interface directed toward publishers. For example, the advertisement distributor system 222 can provide a user interface where publishers can establish an account to become affiliated with an advertising program, and this interface can feature the wizard as a way for the developer(s) to customize the look and feel of content/ads to be displayed in connection with the application 206.

In some implementations, this is implemented as a self-service sign-up process for developers, for example to allow the opportunity to enhance their application offering with ads and/or other content. As another example, and assuming that users' privacy rights are taken into account, such an interface can provide reporting statistics on ad clicks, impressions, queries, revenue and/or other aspects to the advertisement distributor system 222.

Figure 3:
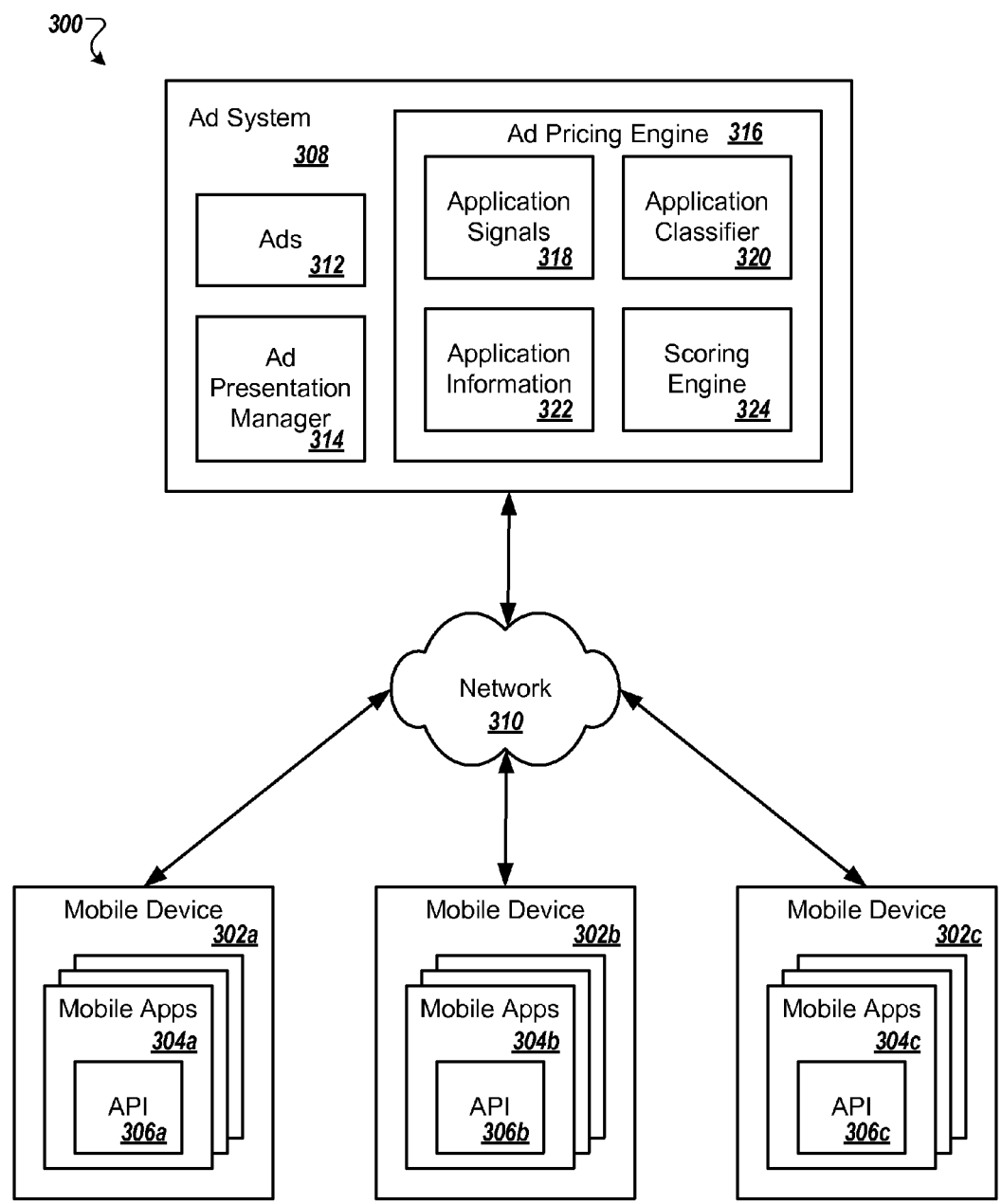
FIG. 3 is a block diagram of an example system including an ad system and one or more mobile devices.

FIG. 3 is a block diagram of an example system 300 including an ad system and one or more mobile devices. The mobile devices each have one or more applications having an associated API. The API allows for interaction with the ad system in order to request and/or receive ads for presentation in the application as well as allowing the ad system to capture data from the application for use in an ad pricing engine.

The system 300 includes one or more mobile devices 302a-c. Each of the mobile devices 302a-c can be a cellular telephone, a smart phone, a netbook, a tablet device, or a personal digital assistant. In some implementations, one or more of the mobile devices 302a-c is a desktop computer, a server, or a laptop.

Each of the mobile devices 302a-c can present content to a user. For example, one or more mobile applications 304a-c, running on the mobile devices 302a-c respectively, can present content to a user. The mobile applications 304a-c can include, for example, one or more news applications, games, productivity applications, social networking applications, browsers, or utility applications. In some implementations, the mobile applications 304a-c are the same application running on different devices, e.g., the mobile devices 302a-c respectively. Alternatively, each represent different applications running on the respective mobile devices.

Each of the mobile applications 304a-c is associated with an API 306a-c. The APIs 306a-c can request and receive content from an external system. For example, the APIs 306a-c can request an ad from an ad system 308. In another example, the APIs 306a-c can request content from a publisher (not shown) or a data storage system. In some implementations, the requested content includes a web page, productivity application data, game data, or social networking data.

Each of the mobile devices 302a-c can connect to the ad system 308 through a network 310. The network 310 can be a local area network, a wide area network, the Internet, or any combination thereof. Each of the mobile devices 302a-c can connect to the network 310 using a type of wireless protocol, e.g., IEEE 802.11, WAP and/or Bluetooth. In some implementations, one or more of the mobile devices 302a-c is coupled to the network 310 using one or more physical cables (e.g., when the mobile device is a desktop computer).

The ad system 308 can serve one or more ads 312 to the mobile devices 302a-c. For example, the API 306a can request an ad from the ad system 308. The ad system 308 can serve one of the ads 312 to the API 306a, and the API 306a can present the received ad in the mobile application 304a. In some implementations, each of the mobile applications 304a-c request ads using the APIs 306a-c respectively. For example, based on ad script in html in a web page being loaded into a web browser, the web browser can request an ad from the ad system 308 using an API.

The ad system 308 can include an ad presentation manager 314. The ad presentation manager 314 can determine which of the ads 312 to serve to the mobile devices 302a-c. The ad presentation manager 314 can identify and rank the ads 312 based on particular criteria in order to match the ads 312 with the requested content, the requesting API, and/or the requesting user. For example, the ad presentation manager 314 can identify ads based on keywords associated with the ads 312 that correspond with the requested content in which the ads are to be presented (e.g., matching ad keywords to keywords in requested content or query terms). In another example, the ad presentation manager 314 uses information about the user (e.g., user profile information) to identify ads. In another example, the ad presentation manager 314 can send a social networking application ads based on the specific application requesting the ads (e.g., the ads are for products or services that appeal to a typical user of the social networking application).

In some implementations, each of the APIs 306a-c logs a user's interaction with the mobile applications 304a-c, respectively. For example, the mobile device 302a can receive input from a user by one or more input sensors. Input sensors can include a touch screen display, a trackball, a keyboard, a microphone, and one or more buttons on the mobile device 302a. The mobile device 302a can determine that the received input is associated with the mobile application 304a and provide the API 306a with the received input. The API 306a can log the received inputs over time.

In some implementations, the received inputs are aggregated so that individually identifying information is anonymized while still maintaining the attributes or characteristics associated with particular inputs. In other implementations, the received inputs are anonymized (so that the originating mobile device or mobile device user is unidentifiable) before transmission to the system that analyzes the received inputs. In this way, the actions of individual users can be obscured or unobservable while still permitting analysis of mobile applications based on user interactions with the mobile applications. Additionally or optionally, users can be provided with an opportunity to opt in/out of programs or features that may collect personal information, including, for example, the collection or logging of user interaction information.

In some implementations, each of the APIs 306a-c can log the duration of use of each of the mobile applications 304a-c, respectively. For example, the API 306b can log the total time a user runs the mobile application 304b on the mobile device 302b. In one example, the API 306c logs the duration of each use of the mobile application 304c on the mobile device 302c. In one example, the API 306a logs the duration between users of the mobile application 304a. In some implementations, each of the APIs 306a-c log the average usage time of each of the mobile applications 304a-c, respectively.

In some implementations, each of the APIs 306a-c log the time of day that each of the mobile applications 304a-c respectively is running. For example, the API 306a can log whether the mobile application 304a is typically run during the day or evening. In some implementations, each of the APIs 306a-c log the total time that the mobile applications 304a-c, respectively, are presented on a portion of a screen of the mobile devices 302a-c and not the time that the mobile applications 304a-c is running but not presented (e.g., when the mobile applications 304a-c are running in the background).

In one example, the mobile application 304a can be a media player and the API 306a can determine that the media player typically receives little input from a user. For example, the media player can present movies to a user, and on average receive input from the user once an hour (e.g., pausing the movie). In one example, the media player can play songs and receive input from the user frequently (e.g., selecting a song to play). In one example, the mobile application 304b can be a poker game and the API 306b can frequently receive input from a user (e.g., selecting a card to play).

In some implementations, each of the APIs 306a-c provides the ad system 308 with logged data associated with various application information. In some implementations, each of the APIs 306a-c provides the ad system 308 with a unique identifier associated with the mobile applications 304a-c when providing application information. For example, the APIs 306a-c can provide an ad pricing engine 316, included in the ad system 308, with application interaction data. The ad pricing engine 316 can store various types of application data 318 including interaction or usage data from APIs 306a-c and other application data (e.g., a number of downloads), in a database in the ad system 308.

In some implementations, the APIs 306a-c provide specific information or data relating to a user interaction with a mobile application (e.g., a user entered their status into a social networking application with a voice command). In some implementations, the APIs 306a-c provide general application information (e.g., a user updated their status). In some implementations, the type of information provided by each of the APIs 306a-c is implementation specific. For example, different types of APIs can request and receive ads from the ad system 308. In one example, a developer can select settings for an API determining the type and frequency of information provided to the ad system 308 by the API. Other types of user interaction data that can be obtained include a frequency of invocation for the mobile application and accelerometer/GPS data (e.g., types of movement associated with using the application).

The APIs 306a-c can provide the application interaction data to the ad pricing engine 316 on a schedule (e.g., once a week), or at specified times (e.g., according to particular criteria, for example, when a user exits a mobile application). In some implementations, when running, each of the APIs 306a-c continuously provides application interaction data to the ad pricing engine 316. For example, the API 306c can provide interaction data to the ad pricing engine 316 when the API 306c identifies the user interaction.

In some implementations, the APIs 306a-c provide application interaction data to the ad system 308 and the ad system 308 logs the application interaction data. For example, when one of the APIs 306a-c receives interaction data (e.g., total usage time), the API 306a-c can send the application interaction data to the ad system 308 without logging the application interaction data. The application interaction data provided to the ad system 308 can be from many different mobile devices and/or mobile applications.

In some implementations, the ad pricing engine 316 pre-processes the application data 318, e.g., to remove outliers. For example, the ad pricing engine 316 can determine that particular interaction data was caused by a user dropping a mobile device and was not intended input for a mobile application on the mobile device. Thus, the ad pricing engine 316 can discard interaction data determined to be erroneous. In some implementations, the ad pricing engine 316 can group application usage data by the application associated with the usage data. For example, the ad pricing engine 316 can group usage data received by the same news application together.

The ad pricing engine 316 can compare the grouped usage data and discard interaction data determined to be significantly different from the other interaction data in the group relating to the news application. For example, the ad pricing engine 316 can discard, or otherwise not take into consideration, application interaction data received from a user who installed and used the news application once. The ad pricing engine 316 can store the pre-processed application data in the same database as the application data 318 received from the mobile devices 302a-c. In some implementations, the ad pricing engine 316 stores the pre-processed application data in another database separate from the database storing the application data 318.

The application usage data 318 can also include other application data not specific to individual user interaction with the application, for example, a number of downloads of the application, the type of the application, whether the application was free or a premium version purchased by the user.

The ad pricing engine 316 includes an application classifier 320 that classifies applications based on the application data 318. The application classifier 320 can map cluster names to application names in an application information table 322, as described in greater detail below. For example, the application information table 322 can include the names of the applications that use an API to request and receive ads from the ad system 308. The API can be provided by the ad system 308 to developers of applications and allow the applications to request ads from the ad system 308. The application information table 322 can include a unique identifier for each of the applications.

The application classifier 320 can determine one or more application clusters that the mobile applications 304a-c are associated with using a classification of the mobile applications, and map the cluster name to the application name or the unique identifier in the application information table 322. In some implementations, the application classifier 320 forms clusters of applications that are similarly classified (e.g., a same or related classification). For example, clusters can be determined based on an intended functionality of the application according to the application content (e.g., game, news, productivity) or finer levels within a category, (e.g., games (arcade), games (strategy), and games (puzzles)).

Additionally, an application publisher can provide tags indicating a type of application content. In some implementations, clusters are determined using online learning based on keywords key words used in ad requests from the application, semantic analysis of an application description page in an application store (e.g., for purchasing and or downloading applications), or from manual analysis of the applications.

In some implementation, other information can be used by the application classifier including time of day when mobile application usage is higher, updated rate for new versions by users, and whether or application is a premium or free version.

Alternatively, in some implementations, no classifier is used. Instead, the pricing model is determined using user interactions for a single application.

The ad pricing engine 316 includes a scoring engine 324 that determines an application score for each application in a cluster. For example, the scoring engine 324 can use the application cluster and the application data 318 to determine a score for an application, as described in greater detail below. The score, e.g., a quality score, can provide an indication of a quality of the mobile application. For example, a particular mobile application installed on one thousand mobile devices can have a higher application score than another mobile application installed on thirteen mobile devices because higher use can indicate higher quality. Similarly, higher usage of an application by users can indicate a higher quality application.

The application score can be used to determine an ad pricing model for advertising in the mobile application. For example, advertising in a mobile application with a higher score can cost more than advertising in a mobile application with a lower score. The application score can indicate an expected return on investment for advertising in a mobile application. For example, an ad presented in a mobile application with a higher application score can be expected to have a higher conversion rate than the same ad presented in a mobile application with a lower application score. The scoring engine 324 can store the score of each application in the application information table 322.

Figure 4:
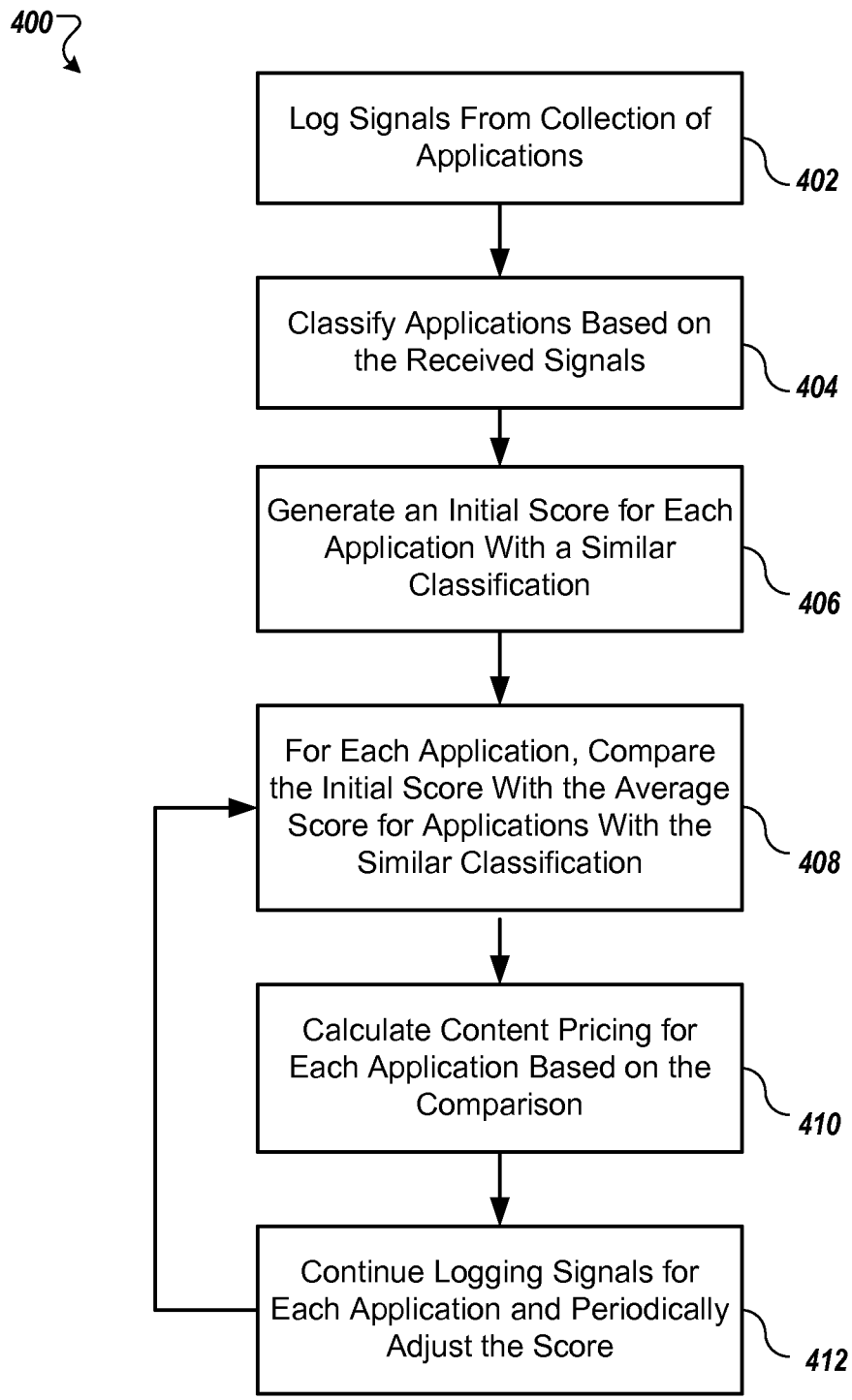
FIG. 4 is a flow chart of an example method for determining content pricing for a mobile application.

FIG. 4 is a flow chart of an example method 400 for determining content pricing for a mobile application. An ad system (e.g., the ad system 308) and parts thereof will be referred to in the following as examples. The method 400 can be performed by one or more other systems in conjunction with or instead of the ad system.

Interaction data are received from a collection of applications (402). For example, the ad system can receive application interaction data from one or more APIs (e.g., the APIs 306a-c) associated with one or more mobile applications (e.g., the mobile applications 304a-c). The interaction data includes information relating to user interaction with the mobile application. In some implementations, the interaction data includes information relating to the usage of the mobile application (e.g., the total time a user has spent interacting with the mobile application).

Application data (e.g., the application data 318) can be stored in a database on the ad system. The data can include information indicating the application they are associated with, e.g., an application title or a unique identifier for the application. The application data includes the interaction data received from each of a collection of applications. The application data can also optionally include other received application data, for example, a number of downloads of the application.

Applications are classified based on the application data (404). In particular, the data obtained from applications are used to build features that are used by to classify and score the applications. For example, an application classifier (e.g., the application classifier 320) can determine a classification for an application. The application classifier can cluster applications with a similar classification. The application classifier can store the classification information in an application information table (e.g., the application information table 322) mapping the classification to the application name.

In some implementations, the application classifier classifies applications after a specified amount of information relating to an application has been logged. For example, when the ad system receives application signals for a mobile application from a predetermined number of mobile devices (e.g., sixty-five) then the application classifier can determine the classification of the mobile application.

An initial score is generated for each application with a similar classification (406). For example, a scoring engine (e.g., the scoring engine 324) can determine the initial score for each application in a cluster. The scoring engine can store the score, for example, in the application information table.

In some implementations, the scoring engine uses one or more weights associated with different types of application data. For example, the total usage of an application can have a greater weight value than the type of input received by the application (e.g., gesture input or keyboard input).

In some implementations, the scoring engine determines a user interaction score for each application in a cluster. The user interaction score can be based on the user interaction signals received from an API associated with an application.

The initial score for each application is compared with an average score for applications with the similar classification (408). For example, an ad pricing engine (e.g., the ad pricing engine 316) can compare the initial score for each application with the average score for applications in the same cluster.

In one example, if the initial score of an application is greater than the average score of applications in the same cluster, an indication to increase the price of presenting an ad in the application can be generated. In another example, if the initial score of an application is lower than the average score of applications in the same cluster, an indication to lower the price of purchasing ad space in the application can be generated.

In some implementations, the scoring engine determines a price indicator $\alpha_A$ for an application A using the following equation:

$$\alpha_A = n \times \frac{(S_A \times U_A)}{\sum_{i=0}^{n-1} S_i \times U_i},$$

where $S_i$ is the classification score for applications i in the cluster of application A; $U_i$ is the score (e.g., user interaction score) for an average user for each application i in the cluster of application A; and n is the number applications in the same cluster as the application A. Similarly, $S_A$ and $U_A$ are the respective scores for the application A. This identifies a price indicator when applications belong to a single category.

However, in some implementations, an application can belong to multiple clusters. Assume that there are K categories/clusters in the system, $\{C_0, C_1, C_{K-1}\}$. An application A belongs to each of them with an associated weight $W(A, C_k)$ for all k. The weight $W(A, C_k)$ can be zero for some k's (e.g., not a member of that category). The relative score of application A in category $C_k$ is:

$$\alpha_k = n_k \left( \frac{S_A U_A}{\sum_{i=0}^{n_{k-1}} S_i U_i} \right) \forall S_i \in C_k.$$

The overall pricing indicator for A, can be computed as:

$$\alpha_A = \sum_{j=0}^{K-1} W(A, C_j) \alpha_j.$$

In some alternative implementations, other techniques, for example, Mantel-Haenszel estimators, are used to determine a pricing indicator for an application.

Content pricing for each application is calculated based on the comparison (410). For example, the ad pricing engine can calculate ad pricing for each application in the same cluster. The ad pricing engine can store ad pricing information in the application information table. Calculating ad pricing for each application can include adjusting an existing pricing or calculating an initial pricing.

In some implementations, the price $\beta$ of advertising in application A is determined by $\beta=\eta \times \alpha$, where $\eta$ is the current price for advertising in the application A and $\alpha$ is the price indicator for the application A. In some implementations, $\eta$ is the current average price for advertising in the same cluster as application A.

The data (e.g., user interaction data) for each application continues to be logged and the score is periodically adjusted (412). For example, the ad pricing engine can continue to receive application interaction data from APIs requesting ads from the ad system. The scoring engine can periodically adjust the classification score and/or the score (e.g., user interaction score) for an application. The ad pricing engine can determine an updated price for advertising in the application based on the adjusted scores.

In some implementations, the score is updated based on a schedule (e.g., monthly, seasonally, or quarterly). In some implementations, the score is updated when the ad pricing engine receives a predetermined amount of additional application data. In some implementations, the ad pricing engine adjusts the price of advertising in an application when the developer of the application requests that the advertising price be updated.

In some alternative implementations, the system determines a pricing model for an application based on user interactions for each individual application across multiple users of that application. Thus, for a given application, user interaction data can be logged for a number of users of that application. The logged user interactions can be aggregated across users. A pricing model can be determined based on the aggregated user interactions, for example, the level of user interactions or the particular types of user interactions. For example, a high level of user interactions (e.g., as compared to some average or baseline value, for example, derived from collected user interaction data across applications) can indicate a higher pricing for ads. Similarly, certain types of user interactions, e.g., active touch inputs, can indicate higher pricing than other types of interactions.

Figure 5:
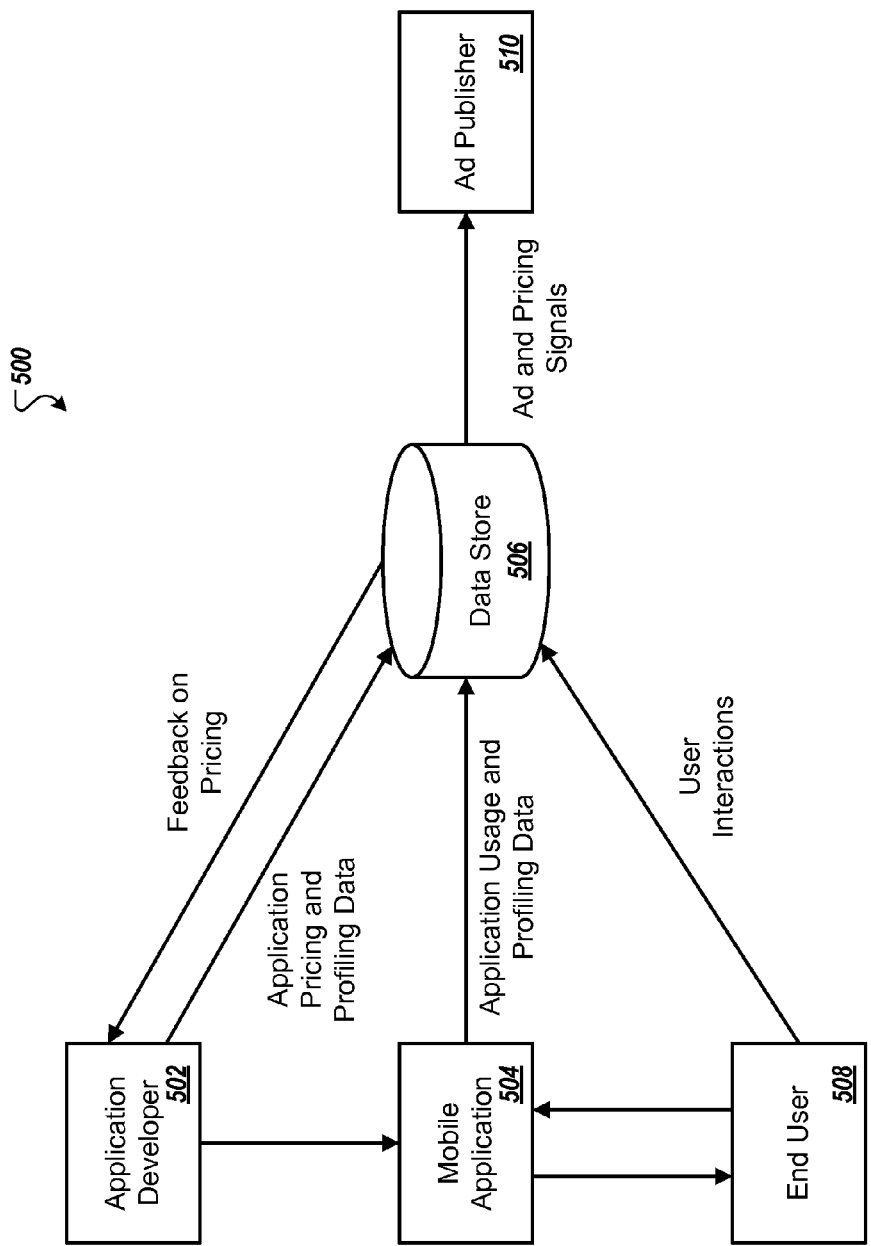
FIG. 5 is a block diagram of an example system for storing mobile application information.

FIG. 5 is a block diagram of an example system 500 for storing mobile application information. An application developer 502 can use a developer system (e.g., the developer system 202) to create a mobile application 504. The mobile application 504 can include an API that allows the mobile application 504 to request ads from an ad system (e.g., the advertisement distributor system 222).

The application developer 502 can provide a data store 506 with application profile data. The application profile data can include pricing information for presenting advertisements in the mobile application 504. The data store 506 can be included in an ad system, e.g., the ad system the mobile application 504 requests ads from. For example, the data store 506 can include the application data 318 and the application information table 322. In some implementations, the data store 506 provides information to the ad system in order to provide directed advertising in the mobile application 504.

The mobile application 504 can provide the data store 506 with application usage and profiling data. For example, the API included in the mobile application 504 can provide usage information to the data store 506. In some implementations, the mobile application 504 requests ads from the data store 506 for presentation in the mobile application 504.

An end user 508 can install the mobile application 504 on a mobile device (e.g., the mobile device 302a). The end user 508 can interact with and/or view content in the mobile application 504. User interaction data can be sent to the data store 506. For example, the API included in the mobile application 504 can receive user input information from the mobile device and provide the user input information to the data store 506.

The data store 506 can provide ad presentation information (e.g., information identifying where to direct the particular advertisement, for example, demographics or keywords) and pricing data to an ad publisher 510. Based on the ad presentation information and pricing signals, the ad publisher 510 can determine to purchase advertising space in one or more mobile applications. The ad presentation information and pricing data can provide the ad publisher 510 with information relating to the expected return on investment. For example, the ad publisher 510 can determine an expected conversion rate of ad impressions to the end user 508 for ads presented in the mobile application 504.

Figure 6:
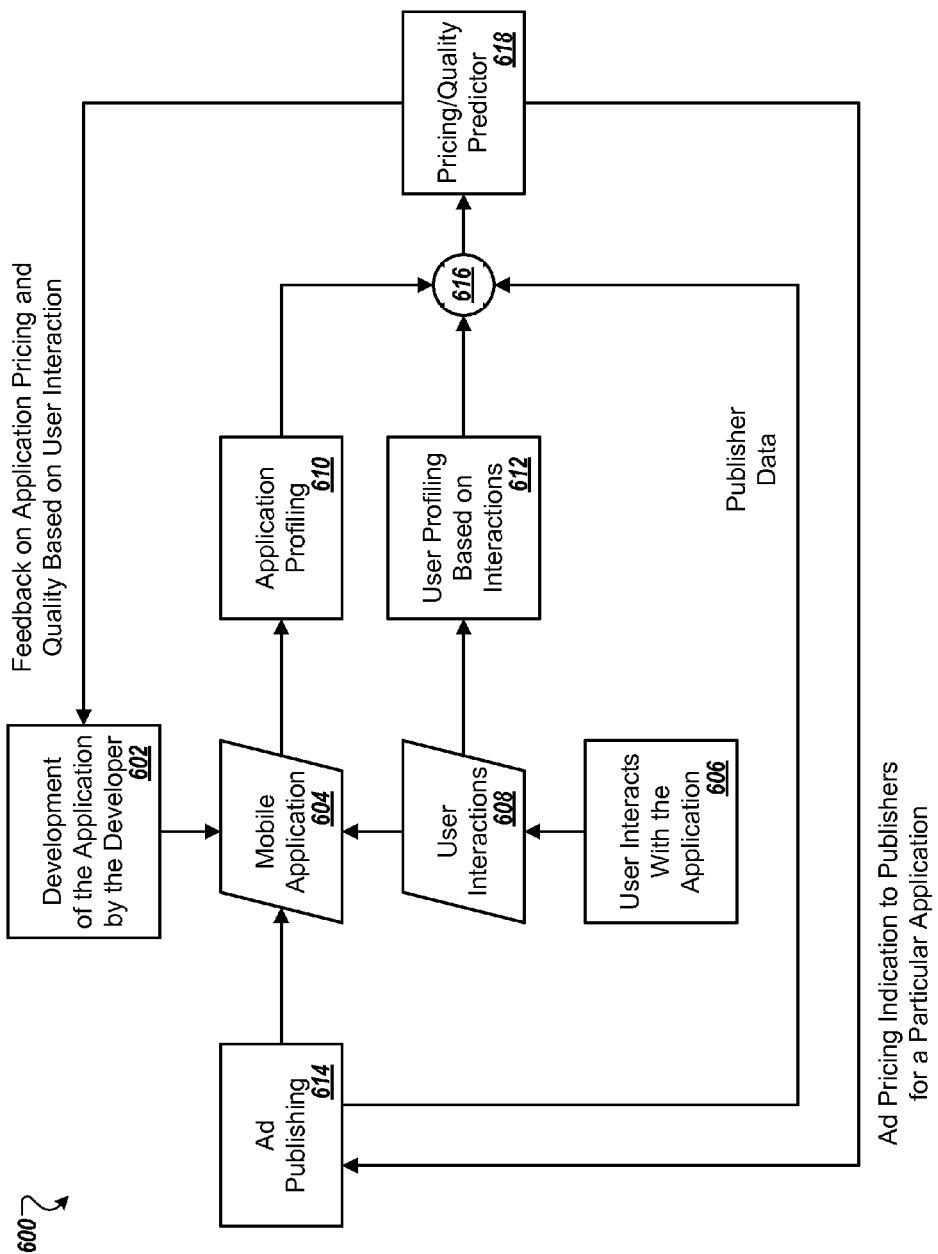
FIG. 6 is a flow diagram of an example method for determining the quality of a mobile application.

FIG. 6 is a flow diagram 600 for determining the quality of a mobile application. Flow diagram 600 includes, for example, various actions and/or operations relative to a mobile application 604. An application is created by a developer (602). For example, the developer can create the mobile application 604.

A user interacts with the application (606). For example, a user of a mobile device can install the mobile application 604 on a mobile device. In another example, the mobile application 604 can be installed on a mobile device before the mobile device is sold to the user.

One or more user interactions 608 are received by the mobile application 604. For example, the mobile device can determine that the user interactions 608 are associated with the mobile application 604.

Application profiling data is generated (610). For example, an application classifier (e.g., the application classifier 320) can receive application data from the mobile application 604. An API in the mobile application 604 can provide the application data to the application classifier.

User profiling data is generated based on the interactions (612). For example, the application classifier can generate user profiling data based on the user interactions 608. The user interactions 608 can be provided to the application classifier by the API.

Advertisements are presented in the mobile application (614). For example, an ad publisher can purchase advertising space in the mobile application 604. An ad presented in the mobile application 604 can be an ad directed to users of the mobile application 604. For example, the mobile application 604 can be a productivity application and the ad can be for another productivity application associated with the mobile application 604. In another example, the ad can be for a product or service that is not necessarily related to the mobile application 604 but is frequently purchased by users of the mobile application 604.

The application profiling data, the user profiling data, and the ad publisher data are combined (616). For example, a scoring engine (e.g., the scoring engine 324) can combine the application profiling data, the user profiling data, and the ad publisher data.

Application price and/or quality predictors are generated (618). For example, the scoring engine can generate a price predictor for the mobile application 604. The price predictor can be a recommended price for selling advertising space in the mobile application 604. The price predictor can be based on the cost of advertising space in application similar to the mobile application 604, e.g., based on applications that are in the same cluster as the mobile application 604.

In some implementations, the scoring engine provides the developer with feedback relating to the application pricing. Additionally, in some implementations, the scoring engine provides the ad publisher with an indication of the ad pricing information. The scoring engine can determine which ad publishers to provide ad pricing information to based on the profiles of the ad publishers. For example, an ad publisher profile can include information indicating a type of mobile application in which the ad publishers typically purchases advertising space.

In some implementations, the scoring engine generates a quality indicator. For example, the quality indicator can be a representation of how much a typical user of a mobile application interacts with the mobile application. The quality indicator can be related to the conversion rate of ads presented in the mobile application. In some implementations, the scoring engine provides the quality indicator to the developer and/or one or more ad publishers.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. The computer storage medium can be, or be included in, a computer-readable storage device, a computer-readable storage substrate, a random or serial access memory array or device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving, for each of a plurality of mobile applications, application data associated with a respective mobile application of the plurality of mobile applications, the application data including different user interaction data associated with the respective mobile application;
    clustering applications of the plurality of mobile applications according to a classification;
    logging user interactions with each application of a cluster of applications for a plurality of users;
    generating an initial score for a first application in the cluster according to the logged interactions; and
    calculating pricing for content items served to the first application based on the initial score and an average score for applications in the cluster.

2. The method of claim 1, further comprising:
    serving one or more content items to the first application according to the calculated application pricing.

3. The method of claim 2, where the one or more content items are advertisements.

4. The method of claim 1, where the data further include data associated with application information received from non-user sources.

5. The method of claim 4, where the application information includes one or more of a type of application or a country of prevalence for the application.

6. The method of claim 1, where calculating application pricing for content items served to the first application includes increasing a pricing when the initial score for the first application is greater than the average score.

7. The method of claim 1, where calculating application pricing for content items served to the first application includes decreasing a pricing when the initial score for the first application is less than the average score.

8. The method of claim 1, further comprising:
    logging user interaction with the first application over time;
    periodically calculating a new score based on the logging; and
    adjusting the pricing based on the new score.

9. The method of claim 1, where application pricing $\beta$ for content items served to the first application A is calculated according to the function $\beta = \eta \times \alpha_A$, where $\eta$ is the current price for advertising in the first application A and $\alpha_A$ is a price indicator for the first application determined according to the formula $$\alpha_A = n \times (S_A \times U_A) \Big/ \sum_{i=0}^{n-1} S_i \times U_i,$$

where $S_i$ is a classification score for an application i in the cluster, $U_i$ is the user interaction score for an average user for an application i in the cluster and n is a number of applications in the cluster.

10. The method of claim 1, where the user interaction data is associated with a plurality of usage characteristics of the respective mobile application.

11. The method of claim 10, where the usage characteristics include user inputs to the mobile application.

12. The method of claim 10, where the usage characteristics include a duration of use for the mobile application.

13. The method of claim 12, where the duration of use is for each invocation of the mobile application.

14. The method of claim 12, where the duration of use is a total time over a specified time period.

15. The method of claim 1, further comprising classifying each application of the plurality of mobile application according to the received application data.

16. The method of claim 1, where clustering includes clustering applications according to a similar classification.

17. A system comprising:
    one or more computing devices operable to perform operations including:
        receiving, for each of a plurality of mobile applications, application data associated with a respective mobile application of the plurality of mobile applications, the application data including different user interaction data associated with the respective mobile application;
        clustering applications of the plurality of mobile applications according to a classification;
        logging user interactions with each application of a cluster of applications for a plurality of users;
        generating an initial score for a first application in the cluster according to the logged interactions; and
        calculating pricing for content items served to the first application based on the initial score and an average score for applications in the cluster.

18. The system of claim 17, further operable to perform operations including:
    serving one or more content items to the first application according to the calculated application pricing.

19. The system of claim 18, where the one or more content items are advertisements.

20. The system of claim 17, where the data further include data associated with application information received from non-user sources.

21. The system of claim 20, where the application information includes one or more of a type of application or a country of prevalence for the application.

22. The system of claim 17, where calculating application pricing for content items served to the first application includes increasing a pricing when the initial score for the first application is greater than the average score.

23. The system of claim 17, where calculating application pricing for content items served to the first application includes decreasing a pricing when the initial score for the first application is less than the average score.

24. The system of claim 17, further configured to perform operations including:
- logging user interaction with the first application over time;
- periodically calculating a new score based on the logging; and
- adjusting the pricing based on the new score.

25. The system of claim 17, where application pricing $\beta$ for content items served to the first application A is calculated according to the function $\beta = \eta \times \alpha_A$, where $\eta$ is the current price for advertising in the first application A and $\alpha_A$ is a price indicator for the first application determined according to the formula $$\alpha_A = n \times (S_A \times U_A) \bigg/ \sum_{i=0}^{n-1} S_i \times U_i,$$

where $S_i$ is a classification score for an application i in the cluster, $U_i$ is the user interaction score for an average user for an application i in the cluster and n is a number of applications in the cluster.

26. The system of claim 17, where the user interaction data is associated with a plurality of usage characteristics of the respective mobile application.

27. The system of claim 26, where the usage characteristics include user inputs to the mobile application.

28. The system of claim 26, where the usage characteristics include a duration of use for the mobile application.

29. The system of claim 28, where the duration of use is for each invocation of the mobile application.

30. The system of claim 28, where the duration of use is a total time over a specified time period.

31. The system of claim 17, further operable to perform operations including classifying each application of the plurality of mobile application according to the received application data.

32. The system of claim 17, where clustering includes clustering applications according to a similar classification.

33. A computer storage medium encoded with a computer program, the program comprising instructions that when executed by data processing apparatus cause the data processing apparatus to perform operations comprising:
- receiving, for each of a plurality of mobile applications, application data associated with a respective mobile application of the plurality of mobile applications, the application data including different user interaction data associated with the respective mobile application;
- clustering applications of the plurality of mobile applications according to a classification;
- logging user interactions with each application of a cluster of applications for a plurality of users;
- generating an initial score for a first application in the cluster according to the logged interactions; and
- calculating pricing for content items served to the first application based on the initial score and an average score for applications in the cluster.

34. The computer storage medium of claim 33, further comprising instructions to perform operations including:
- serving one or more content items to the first application according to the calculated application pricing.

35. The computer storage medium of claim 34, where the one or more content items are advertisements.

36. The computer storage medium of claim 33, where the data further include data associated with application information received from non-user sources.

37. The computer storage medium of claim 36, where the application information includes one or more of a type of application or a country of prevalence for the application.

38. The computer storage medium of claim 33, where calculating application pricing for content items served to the first application includes increasing a pricing when the initial score for the first application is greater than the average score.

39. The computer storage medium of claim 33, where calculating application pricing for content items served to the first application includes decreasing a pricing when the initial score for the first application is less than the average score.

40. The computer storage medium of claim 33, further comprising instructions to perform operations including:
- logging user interaction with the first application over time;
- periodically calculating a new score based on the logging; and
- adjusting the pricing based on the new score.

41. The computer storage medium of claim 33, where application pricing $\beta$ for content items served to the first application A is calculated according to the function $\beta = \eta \times \alpha_A$, where $\eta$ is the current price for advertising in the first application A and $\alpha_A$ is a price indicator for the first application determined according to the formula $$\alpha_A = n \times (S_A \times U_A) \bigg/ \sum_{i=0}^{n-1} S_i \times U_i,$$

where $S_i$ is a classification score for an application i in the cluster, $U_i$ is the user interaction score for an average user for an application i in the cluster and n is a number of applications in the cluster.

42. The computer storage medium of claim 33, where the user interaction data is associated with a plurality of usage characteristics of the respective mobile application.

43. The computer storage medium of claim 42, where the usage characteristics include user inputs to the mobile application.

44. The computer storage medium of claim 42, where the usage characteristics include a duration of use for the mobile application.

45. The computer storage medium of claim 44, where the duration of use is for each invocation of the mobile application.

46. The computer storage medium of claim 44, where the duration of use is a total time over a specified time period.

47. The computer storage medium of claim 33, further comprising instructions to perform operations comprising: classifying each application of the plurality of mobile application according to the received application data.

48. The computer storage medium of claim 33, where clustering includes clustering applications according to a similar classification.

\* \* \* \* \*